Patented Mar. 15, 1949

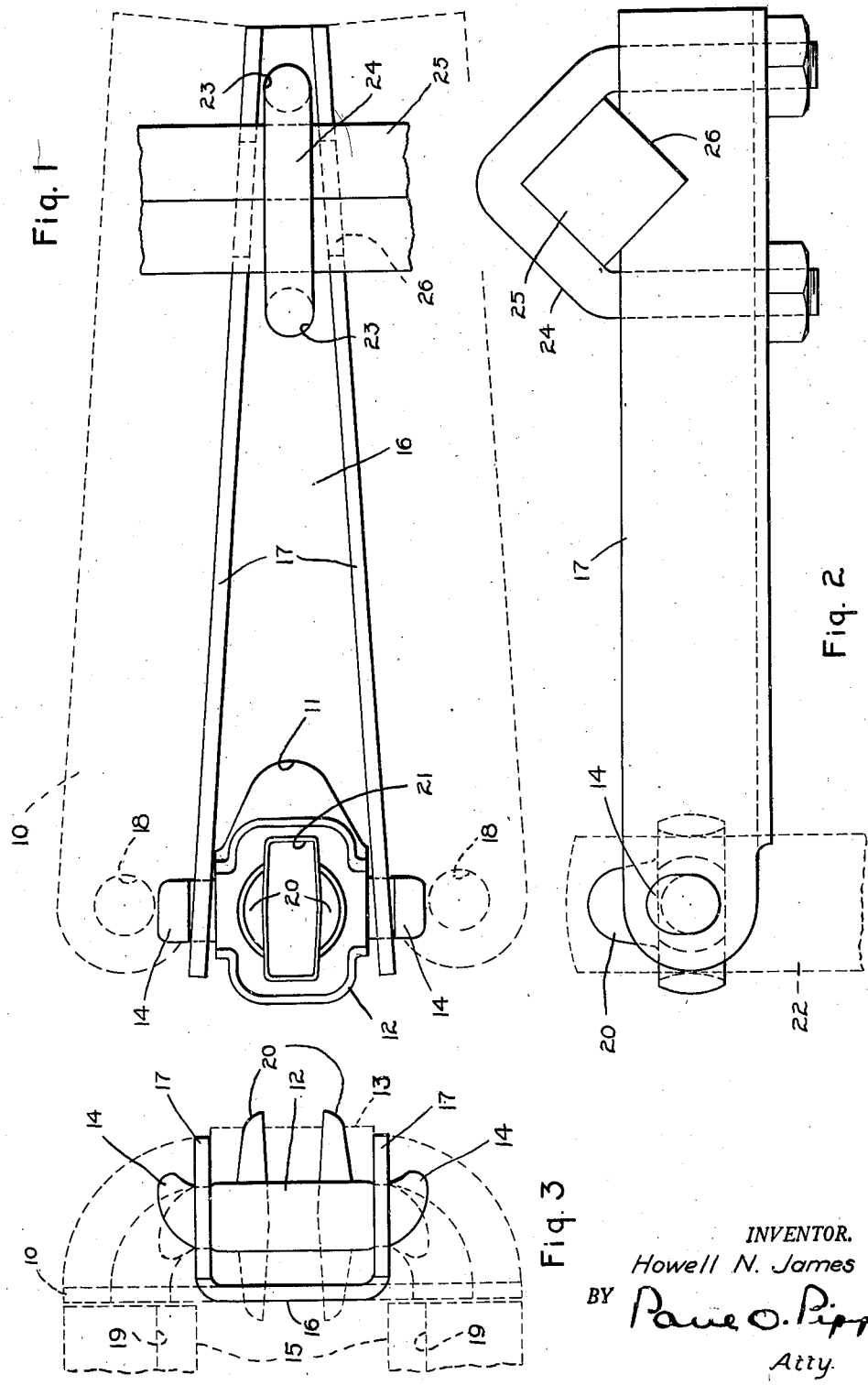

2,464,511

UNITED STATES PATENT OFFICE 2,464,511

IMPLEMENT ROCK ARM CONSTRUCTION

Howell N. James, Hamilton, Ontario, Canada, assignor to International Harvester Company of Canada, Limited, Hamilton, Ontario, Canada, a corporation of Ontario Application October 29, 1947, Serial No. 782,781

5 Claims. (Cl. 29—148)

This invention relates to lift arms for agricultural implements and particularly to a method and means for their manufacture.

The type of lift or rock-arm with which this invention is concerned is well known to those skilled in the agricultural implement art. Several of such lift arms may be mounted upon a rock-shaft carried by the frame of a machine, such as a grain drill, wherein the lift arm is operatively connected to each furrow opener unit to lift it from the ground. Such a lift arm is provided at one end with a clamp for connection to the rock-shaft and at its other end with a swivel for sliding connection by means of a lift rod with the furrow opener or other operating unit to be lifted. The assembly of these parts is time consuming and costly.

An object of the present invention is the provision of a novel and economical method for the production of lift arms or the like for agricultural implements.

Another object of the invention is to provide an improved method and means for quickly and efficiently assembling the parts of a lift arm or the like for an agricultural implement.

Other objects and advantages of the invention will become apparent after consideration of the following detailed description when read in conjunction with the accompanying drawings wherein:

Figure 1 is a plan view of a lift arm made according to the method of the present invention;

Figure 2 is a side elevation of the structure shown in Figure 1; and

Figure 3 is an end elevation of the lift arm.

A lift arm such as is contemplated by this invention customarily comprises two arm portions or bars provided with openings in one end to receive the trunnion ends of the swivel. The other ends of the arms are then joined by a clamping structure carrying a U-bolt or the like for securing the arm to the implement rock-shaft. The present invention contemplates the provision of a one-piece arm made by placing a sheet metal blank in a die and bending the sides at right angles to form a U-shaped channel. The swivel is placed in a cavity in the forming die and the trunnion ends thereof are received in openings provided in the flanges of the channel member. The opposite end of the channel member has openings therein to receive a U-bolt by which the lift arm is attached to a rock-shaft, thus eliminating the need for a clamping structure for holding together the separate parts of a conventional lift arm.

According to the invention, a blank of suitable dimensions is cut from a piece of sheet metal, the blank being generally rectangular, but preferably frusto-conical in shape and of a length determined by the length of lift arm required. The blank is indicated in dotted lines in Figures 1 and 3 and is designated by the numeral 10. The larger end of the blank is provided with a cut-out or recessed portion indicated at 11 to accommodate rocking of a swivel 12.

The blank 10 is placed upon a die 13 having a cavity therein to receive the swivel 12, which has ears 14 projecting laterally from opposite sides of the die. Shaping elements 15 are then applied to the blank in the manner indicated in dotted lines in Figure 3 to form a U-shaped channel having a base 16 and flanges 17. When placed in the cavity in the die, the ears 14 of the swivel, which are bent at an angle to the axis thereof, are turned in the direction of the blank as shown in dotted lines in Figure 3, and upon actuation of the shaping elements 15 to bend the blank and form flanges 17, the ears 14 are received in openings 18 preformed in the blank. Grooves 19 in the shaping elements 15 accommodate the ears 14 of the swivel during the flange forming operation. The swivel 12 is now rotated through approximately 180° to the solid line position of Figure 3. In this position ears 14 are pointed in a direction to prevent their displacement from the flanges through the openings 18 and serves as a brace for the flanges as well as to lock the swivel in place. Likewise in this position lugs 20 extend upwardly at opposite sides of an elongated opening 21 in the swivel.

In operation a lift arm of the present invention is disposed in a generally horizontal position with the ears 14 of the swivels extending downwardly. A lift rod or bar 22 indicated in dotted lines in Figure 2 extends generally vertically through the opening 21 in the swivel and has its lower end connected to operating units, not shown, to be raised and lowered. Suitable stop means, not shown, may be provided at the upper end of bar 22 to prevent displacement of the bar from the swivel during lifting.

The end of the lift arm opposite the swivel 12 is provided with openings 23 to receive a U-bolt 24 by which the lift arm is clamped to the conventional square rock-shaft 25 of an agricultural implement. Flanges 17 are notched at 26 to seat the rock-shaft.

From the foregoing description it will be noted that a novel and economical method has been described for the production of a lift arm for an agricultural implement. It should, of course, be understood that modifications may be made in the invention without departing from the spirit thereof or the scope of the appended claims.

What is claimed is:

1. The method of manufacturing a lift arm or the like for an implement which comprises the steps of forming a swivel having trunnions angularly bent at their ends to retain the swivel against displacement, cutting a generally rectangular metal blank, forming openings in said blank, positioning the swivel with the trunnion ends adjacent said openings, bending said blank longitudinally to form opposed flanges having said openings therein, continuing to bend said flanges until the swivel trunnions are received therein, and rotating the swivel until the bent ends of said trunnions are in locking position with respect to said flanges.

2. The method of manufacturing a lift arm or the like for an implement which comprises cutting a generally rectangular blank, forming openings in said blank, placing the blank upon a die of similar shape but narrower in width, positioning in a cavity in said die adjacent one end a swivel having trunnions extending laterally from the die and bent at their ends to retain the swivel against displacement, bending said blank along the edges of the die to form flanges having said openings therein, continuing to bend said flanges until the swivel trunnions are received therein, and rotating the swivel until the bent ends of said trunnions are in locking position with respect to said flanges.

3. The method of manufacturing a lift arm or the like for an implement which comprises cutting an elongated sheet metal blank, forming openings in said blank and providing a recess in one end thereof, placing the blank upon a die of narrower width than the blank and having an open cavity therein adjacent said recess, positioning in said cavity within said recess a lift rod receiving swivel having trunnions projecting laterally from the die and bent at their ends, the bend in said trunnion ends being directed toward said blank, bending said blank along the edges of the die to form flanges having said openings therein, continuing to bend said flanges until said trunnions are received in said openings, and rotating said swivel through approximately 180 degrees.

4. The method of manufacturing a lift arm or the like to be mounted upon the lifting rock-shaft of an implement comprising cutting a substantially frusto-conical sheet metal blank, forming openings in said blank at both ends and a recess in the larger end thereof between the openings in that end, positioning adjacent said recess a swivel having trunnions spaced from and parallel to the blank and having their ends radially bent in the direction of the blank, bending said blank along lines parallel to adjacent longitudinal edges of said blank to form a U-shaped channel having openings in the flanges thereof, continuing to bend said flanges until said trunnions are received in said openings, and rotating said swivel through 180 degrees.

5. The method of manufacturing a lift arm or the like to be mounted upon the lifting rock-shaft of an implement comprising cutting a substantially frusto-conical sheet metal blank, forming openings in said blank at both ends and a recess in the larger end thereof between the openings in that end, positioning adjacent said recess a swivel having trunnions spaced from and parallel to the blank and having their ends radially bent in the direction of the blank, bending said blank along lines parallel to adjacent longitudinal edges of said blank to form a U-shaped channel having openings in the flanges thereof, continuing to bend said flange until said trunnions are received in said openings and rotating said swivel through 180 degrees, and providing a U-bolt in the openings in the smaller end of said blank for attachment of the lift arm to said implement rock-shaft.

HOWELL N. JAMES.

REFERENCES CITED

The following references are of record in the file of this patent:

UNITED STATES PATENTS

| Number | Name | Date |
|--------|------|------|
| 325,221 | Wright | Aug. 25, 1885 |
| 1,699,546 | Scheibli | Jan. 22, 1929 |
| 2,232,997 | Caldwell | Feb. 25, 1941 |